(12) United States Patent
Ferrer et al.

(10) Patent No.: US 9,156,290 B2
(45) Date of Patent: Oct. 13, 2015

(54) SYSTEM AND METHOD FOR PRINTING ON CONTINUOUS FEED MEDIA

(71) Applicant: System Development Inc., Houston, TX (US)

(72) Inventors: Peter Ferrer, Houston, TX (US); Paul R. Boutan, Houston, TX (US)

(73) Assignee: SYSTEM DEVELOPMENT INC., Houston, TX (US)

( * ) Notice: Subject to any disclaimer, the term of this patent is extended or adjusted under 35 U.S.C. 154(b) by 0 days.

(21) Appl. No.: 14/537,174

(22) Filed: Nov. 10, 2014

(65) Prior Publication Data

US 2015/0062230 A1 Mar. 5, 2015

Related U.S. Application Data

(63) Continuation of application No. 13/774,783, filed on Feb. 22, 2013, now Pat. No. 8,908,197.

(51) Int. Cl.
| | |
|---|---|
| *B41J 29/393* | (2006.01) |
| *B41J 13/00* | (2006.01) |
| *G06K 15/16* | (2006.01) |
| *G06K 15/02* | (2006.01) |
| *H04N 1/00* | (2006.01) |
| *B41J 11/46* | (2006.01) |

(52) U.S. Cl.
CPC .............. *B41J 13/0009* (2013.01); *B41J 11/46* (2013.01); *G06K 15/027* (2013.01); *G06K 15/16* (2013.01); *H04N 1/00* (2013.01)

(58) Field of Classification Search
CPC .... B41J 13/0009; B41J 11/46; G06K 15/027; G06K 15/16; H04N 1/00
See application file for complete search history.

(56) References Cited

U.S. PATENT DOCUMENTS

| | | | | |
|---|---|---|---|---|
| 4,807,790 | A | * | 2/1989 | Ushioda et al. .................... 226/2 |
| 4,924,266 | A | * | 5/1990 | Negoro et al. .................. 399/21 |
| 5,244,293 | A | * | 9/1993 | Ludger et al. ................. 400/611 |
| 6,402,405 | B1 | * | 6/2002 | Frodl et al. .................... 400/582 |

* cited by examiner

*Primary Examiner* — Julian Huffman
(74) *Attorney, Agent, or Firm* — Conley Rose, P.C.

(57) ABSTRACT

A system and method for printing on continuous feed media. In one embodiment, a computer-readable storage device is encoded with instructions that when executed cause a processor to: 1) print, via a printer, an image on continuous feed media; 2) compute a compensation factor that accounts for variation in form length of the continuous feed media; 3) compute, based on the computation factor, a distance to advance the continuous feed media such that a succeeding print starts at a top of form location of the continuous feed media; and 4) cause the printer to advance the continuous feed media in accordance with the determined distance to advance such that the succeeding print starts at the top of form location of the continuous feed media.

20 Claims, 8 Drawing Sheets

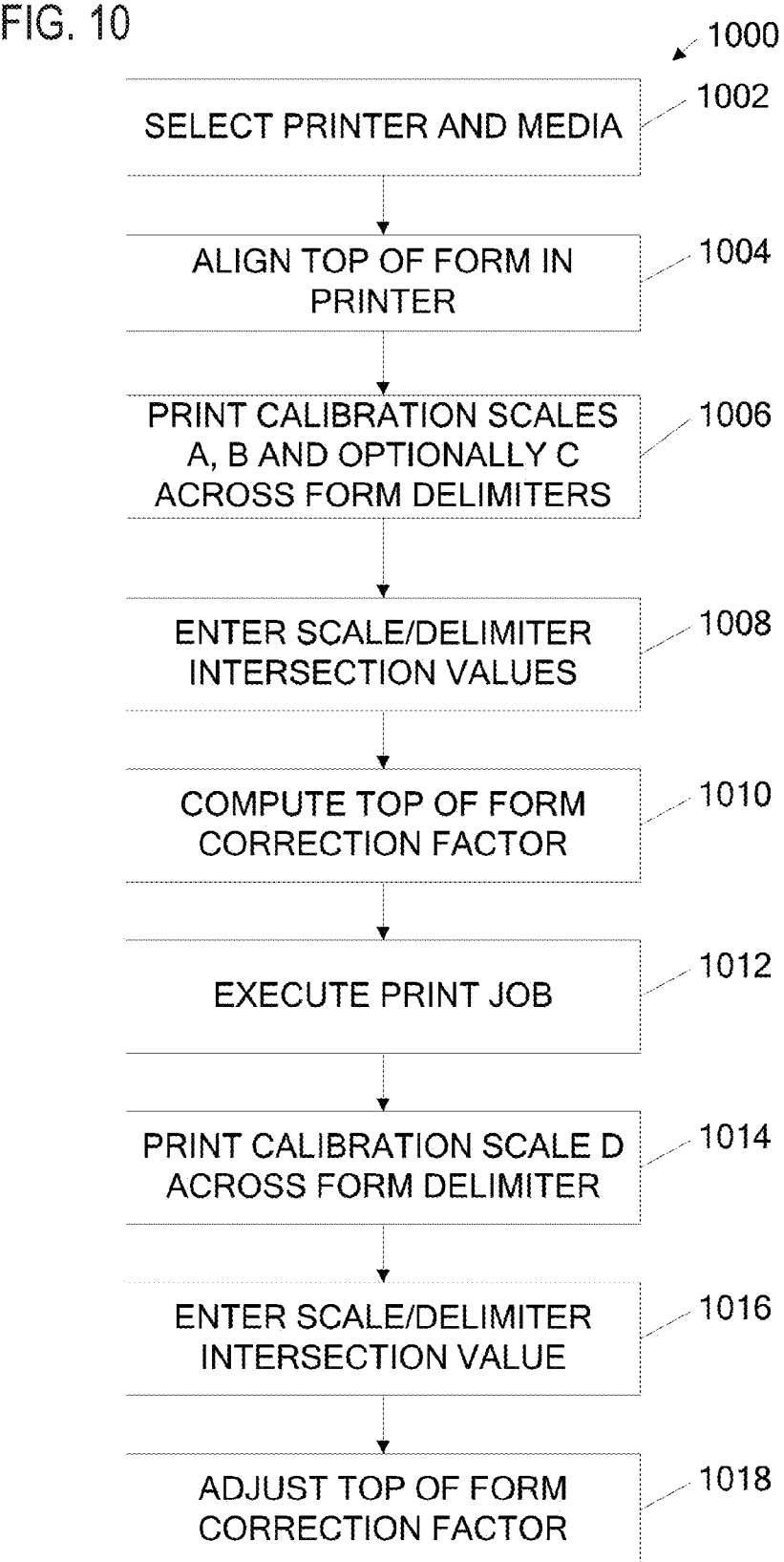

SYSTEM AND METHOD FOR PRINTING ON CONTINUOUS FEED MEDIA

CROSS-REFERENCE TO RELATED APPLICATIONS

This application is a continuation of U.S. patent application Ser. No. 13/774,783, filed Feb. 22, 2013, entitled "System and Method for Determining Top of Form," the disclosure of which is hereby incorporated herein by reference in its entirety.

BACKGROUND

In some computer applications, output information may be printed on a continuous sequence of connected forms. Applications that present information as a lengthy continuous graphic often employ such printing techniques. For example, a well log recorded while drilling a borehole through subsurface formations may be printed as a graph that is many feet in length. Consequently, well logs are often printed over a substantial number of sequentially connected sheets of paper or other printing media.

Continuous feed paper or other media for use in extended length printing may include delimiters that subdivide an elongated web into forms. The delimiters may include perforations and/or folds. For example, some such print media is provided as an elongated web that includes perforations along spaced transverse lines that divide the web into uniform lengths or individual panels (forms) in the longitudinal direction. The perforations produce weakening lines in the web that facilitate folding of the web into a stack of forms, with alternate lines forming opposing edges of a form. An elongated web including such form delimiters is commonly referred to as continuous forms, fanfold media, or the like.

SUMMARY

A system and method for determining top-of-form for printing with continuous feed media are disclosed herein. In one embodiment, a printing system includes a storage device encoded with instructions, and a processor. The processor executes the instructions to: 1) print an image on continuous feed media via a printer; 2) compute a compensation factor that accounts for variation in form length of the continuous feed media; 3) compute, based on the computation factor, a distance to advance the continuous feed media such that a succeeding print starts at a top of form location of the continuous feed media; and 4) cause the printer to advance the continuous feed media in accordance with the determined distance to advance such that the succeeding print starts at the top of form location of the continuous feed media.

In another embodiment, a method for printing includes: 1) printing, via a printer, an image on continuous feed media; 2) computing a compensation factor that accounts for variation in form length of the continuous feed media; 3) computing, based on the computation factor, a distance to advance the continuous feed media such that a succeeding print starts at a top of form location of the continuous feed media; and 4) causing the printer to advance the continuous feed media in accordance with the determined distance to advance such that the succeeding print starts at the top of form location of the continuous feed media.

In a further embodiment, a computer-readable storage device is encoded with instructions that when executed cause a processor to: 1) print, via a printer, an image on continuous feed media; 2) compute a compensation factor that accounts for variation in form length of the continuous feed media; 3) compute, based on the computation factor, a distance to advance the continuous feed media such that a succeeding print starts at a top of form location of the continuous feed media; and 4) cause the printer to advance the continuous feed media in accordance with the determined distance to advance such that the succeeding print starts at the top of form location of the continuous feed media.

BRIEF DESCRIPTION OF THE DRAWINGS

For a detailed description of exemplary embodiments of the invention, reference will now be made to the accompanying drawings in which:

FIG. 7 shows an exemplary depiction of a top of form calibration dialog display in accordance with various embodiments;

FIG. 9 shows an exemplary depiction of a top of form delta calibration dialog display in accordance with various embodiments; and FIG. 10 shows a flow diagram for a method for top of form determination for continuous feed media in accordance with various embodiments.

NOTATION AND NOMENCLATURE

Figure 1:
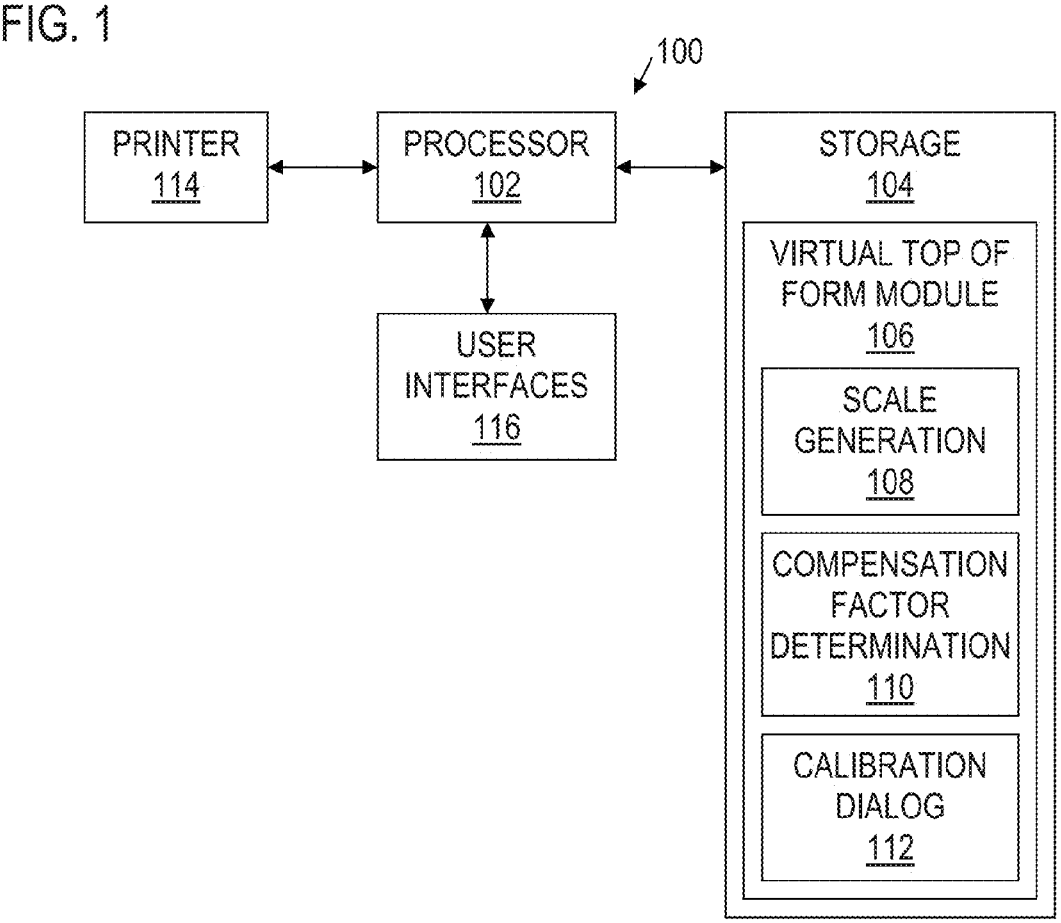
FIG. 1 shows a block diagram of a system for top of form determination for continuous feed media in accordance with various embodiments.

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ."

The term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection.

The term "software" includes any executable code capable of running on a processor, regardless of the media used to store the software. Thus, code stored in memory (e.g., non-volatile memory), and sometimes referred to as "embedded firmware," is included within the definition of software.

The recitation "based on" is intended to mean "based at least in part on." Therefore, if X is based on Y, X may be based on Y and any number of other factors.

The term "continuous feed medium/media" is intended to mean any medium of indefinite or extended length onto which a printing and/or plotting device can affix an image and the printed media thereafter detached from the conjoined blank media. Examples of continuous feed media include paper or other substrate materials supplied in roll form, as fanfold sheets, etc. onto which characters and/or images can be printed. Continuous feed media may be referred to by various names, for example, banner media, roll media, fanfold media, continuous form media, web media, etc.

The terms "top of form," "top of form location," and the like refer to the first longitudinal location on a form at which a printer will print when the form is aligned to begin printing at the leading edge of the form.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

When printing to a continuous feed media that is subdivided into forms by delimiters included in the media, it is desirable to initiate printing of each print at a top of a form location. Accordingly, prior to initiation of a print, the media must be advanced or otherwise positioned such that printing begins at the top of form. To detect top of form and align the media, conventional continuous feed media printing systems may employ specialized media that includes top of form markers and sensors in the printer that detect the top of form marker. Alternatively, prior to each print, manual alignment may be required to position the print media for initiation of printing at the top form. Unfortunately, media including top of form markers and printers that detect the markers on the media are expensive. Similarly, time spent to manually align the media also increases the expense of using continuous feed media.

Embodiments of the printing system disclosed herein employ standard printers and media in conjunction with novel calibration techniques that allow the printing system to automatically determine top of form location in continuous feed media that lacks top of form indications. By employing standard printers and media, and providing automatic top of form alignment, embodiments reduce the acquisition and operating costs associated with continuous feed printing.

FIG. 1 shows a block diagram of a system 100 for top of form determination for continuous feed media in accordance with various embodiments. The system 100 includes a processor 102 coupled to storage 104, user interfaces 116, and a printer 114. In some embodiments, the processor 102, storage 104, and user interfaces 116 may be embodied in a computer as is known in the art. For example, the processor 102, storage 104, and user interfaces 116 may be embodied in a desktop computer, a notebook computer, a rack-mount computer, a network attached server, a tablet computer, or other suitable computing device.

The processor 102 may be, for example, a general-purpose microprocessor, digital signal processor, microcontroller, or other device configured to execute instructions for performing the top of form determination operations disclosed herein. Processor architectures generally include execution units (e.g., fixed point, floating point, integer, etc.), storage (e.g., registers, memory, etc.), instruction decoding, peripherals (e.g., interrupt controllers, timers, direct memory access controllers, etc.), input/output systems (e.g., serial ports, parallel ports, etc.) and various other components and sub-systems.

The storage 104 stores instructions that the processor 102 executes to perform the top of form determination functions disclosed herein. The storage 104 is a non-transitory computer-readable storage device. A computer-readable storage device may include volatile storage such as random access memory, non-volatile storage (e.g., a hard drive, an optical storage device (e.g., CD or DVD), FLASH storage, read-only-memory), other non-transitory storage media, and combinations thereof. Processors execute software instructions. Software instructions alone are incapable of performing a function. Therefore, in the present disclosure, any reference to a function performed by software instructions, or to software instructions performing a function is simply a shorthand means for stating that the function is performed by a processor executing the instructions.

The user interfaces 116 may include various devices for conveying information from a user to the processor 102 and/or for conveying information from the processor 102 to the user. Accordingly, with regard to inputting information to the processor 102, the user interfaces 116 may include a keyboard, a mouse, a trackball, a touchscreen, a touchpad, microphone, or other suitable user input device. With regard to providing information to the user, the user interfaces 116 may include a video display, such as a liquid crystal display or other suitable display technology.

The printer 114 is a device for affixing graphical and/or textual information provided by the processor 102 to a continuous feed media. The continuous feed media may include delimiters, such as transverse folds or perforations, that subdivide the media into forms. The media may be, for example, fan-fold paper. The media may lack top of form indications detectable by the printer 114, and the printer 114 may lack a sensor for detecting a top of form indication on the media being printed. The IMAGEPROGRAF iPF510 by CANON Corporation is an example of a printer suitable for use as the printer 114.

The storage 104 includes a virtual top of form determination module 106. The virtual top of form determination module 106 includes instructions that, when executed, cause the processor 102 to perform operations that provide for determination of top of form in continuous feed media. The virtual top of form determination module 106 includes scale generation logic 108, compensation factor determination logic 110, and calibration dialog logic 112.

Figure 2:
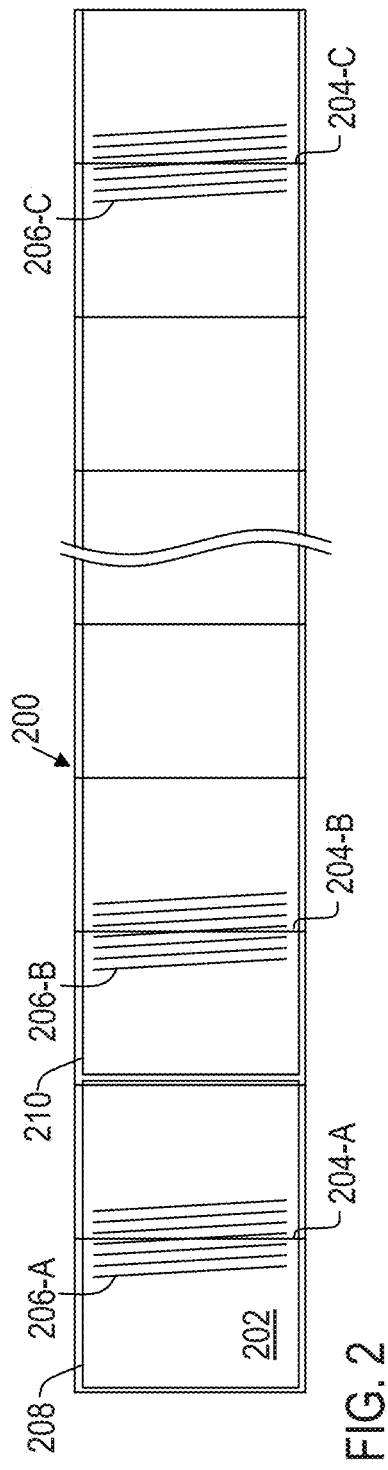
FIG. 2 shows calibration scales printed across form delimiters of continuous feed media in accordance with various embodiments.

The system 100 determines the top of form location for continuous feed media by determining various parameters of the printer 114 and the media being printed, computing compensation factors based on the parameters, and applying the compensation factors to determine the location of a succeeding top of form following completion of each print. To determine the parameters of the printer 114 and the media being printed, the system 100 prints one or more calibration scales on a portion of the media. FIG. 2 shows a length of continuous feed media 200. The media is subdivided into forms 202 by the delimiters 204 (204-A, 204-B, AND 204-C are shown). Calibration scales 206 (shown as scales 206-A, 206-B, and 206-C) are printed across the delimiters 204 at selected locations of the media 200. The calibration scale 206-A may be printed as part of a first print 208, and the calibration scale 206-B and, optionally 206-C, may be printed as part of a second print 210. The system 100 estimates the locations of the delimiters across which the calibration scales are printed based on a form length value entered (e.g., by selection from a menu) by a user and the media 200 being aligned to start printing at top of form prior to initiation of calibration scale printing. For example, the user may select a page size value indicating the forms 200 are expected to be 6.25 inches in length, 8.5 inches in length, etc.

Figure 3:
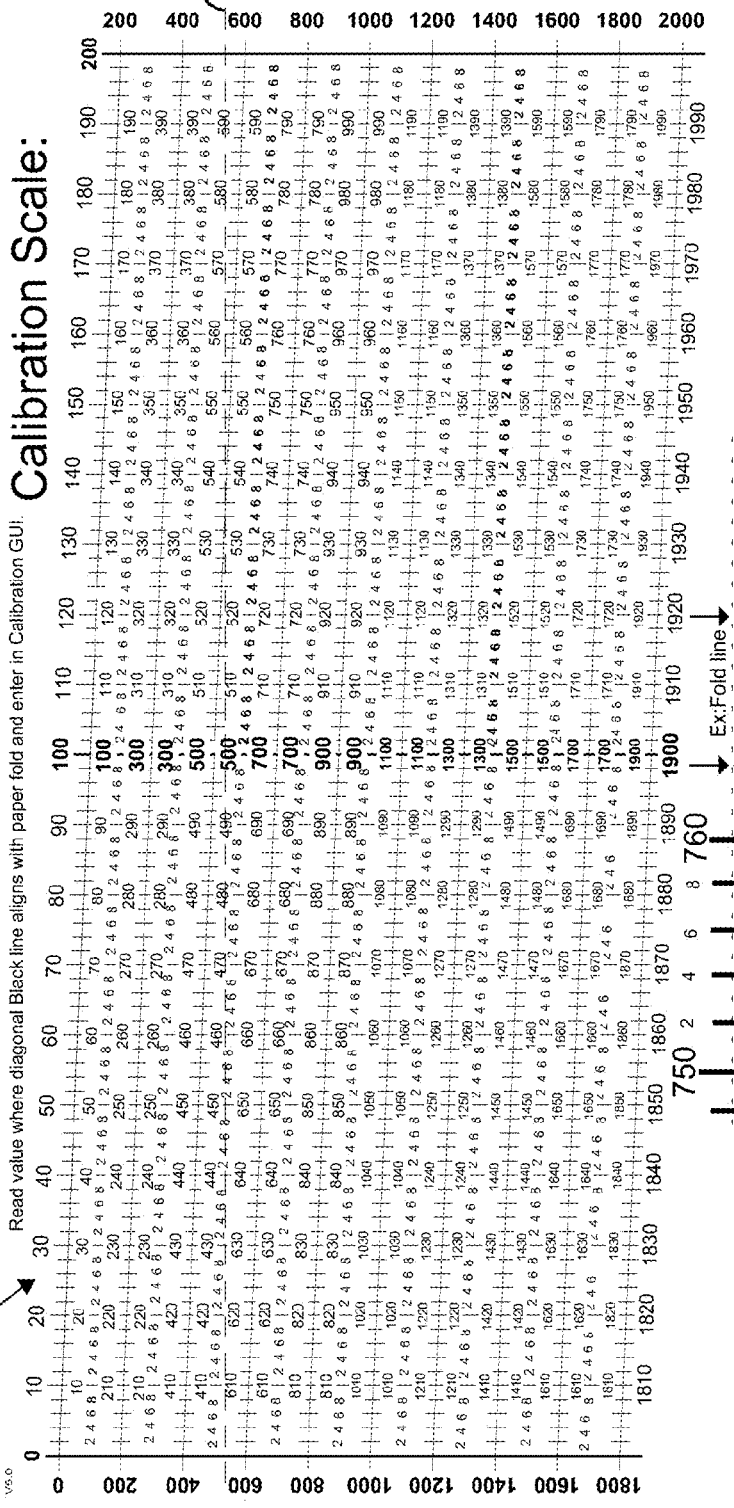
FIG. 3 shows an exemplary calibration scale in accordance with various embodiments.

FIG. 3 shows an exemplary calibration scale 206-A in accordance with various embodiments. The calibration scales 206-B and 206-C may be similar to or the same as the calibration scale 206-A. The calibration scale 206-A is printed across the form delimiter 204-A. The calibration scale 206-A includes a series of lines printed oblique to the delimiter 204-B. A value of the calibration scale 206-A at the point of intersection with the delimiter 204-A is provided to the system 100 for use in computing a top of form determination compensation factor. For example, in FIG. 3, the delimiter 204-A intersects the calibration scale 206-A at approximately scale value 543. Scale values at an intersection of delimiters 204-B and 204-C with the scales 206-B and 206-C may also be provided to the system 100 for use in computing a top of form compensation factor.

As noted above, the system 100 determines various parameters of the printer 114 based on the scale values derived from the calibration scales 206-A, B, C. The compensation factor determination logic 110 may be executed by the processor 102 to determine values of the parameters affecting top of form determination. The printer parameters include a top margin value enforced by the printer and a bottom margin value enforced by the printer. The top and bottom margins are areas of the media 200 over which the printer 114 advances without printing at the start and end of a print. Thus, the margins are unprinted areas that the system 100 accounts for in determining the location of top of form. Because the media 200 is aligned to start printing at top of form prior to initiation of print 208, the scale value read from calibration scale 206-A indicates the length of the print from the top of form to the delimiter 204-A, and the system 100 can determine top margin length based on the length of the form 202 and the difference between expected and actual printed length to the delimiter.

The system 100 may compute the top margin length (TM) in inches as:

$$TM = \frac{S - A}{R}$$

where:
S is a preselected value of scale 206-A that intersects the form delimiter 204-A if no top margin is enforced by the printer 114;
A is the value at which the scale 206-A intersects the form delimiter 204-A; and
R is the resolution of the scale 206 in gradations per inch.

Similarly, the system 100 can determine the bottom margin based on the top margin and the scale value read from the calibration scale 206-B. The system 100 may initiate print 210 immediately following completion of the print 208. The printer 114 will advance a bottom and top margin distance between the prints 208 and 210. The system 100 can determine the combined bottom and top margin distance from the difference in the values of scales 206-B and 206-A. Having determined the top margin based on scale 206-A, the system 100 can determine the bottom margin distance by subtracting the top margin from the combined bottom and top margin distance.

The system 100 may compute the bottom margin length (BM) in inches as:

$$BM = \left(\frac{A - B}{R}\right) - TM - (PS(1 - CF))$$

where:
A, R, and TM are as defined above with respect to top margin;
B is the value at which the scale 206-B intersects the form delimiter 204-B; and (PS(1−CF)) is compensation for the accumulated form length error over the two forms separating delimiters 204-A and 204-B;
where:
PS is double the form length (inches); and
CF is a unitless length correction factor value as defined below.

In order to allow for accumulation of incrementally small print length inaccuracies, such as printer advance errors and form length errors, and to determine a length correction factor that compensates for such inaccuracies, the print 210 may be relatively lengthy (e.g., >20 forms in length). Printer advance errors are inaccuracies in the distance the media 200 is advanced by the printer 114 to print a new line. Form length errors represent deviations from the expected form length. The system 100 may determine a combined length correction factor to compensate for printer advance and form length errors based on the scale values read from calibration scales 206-B and 206-C, where the difference between the two scale values represents the difference between the actual and expected distance between delimiters 204-B and 204-C.

The system 100 may compute the correction factor (CF) as:

$$CF = \frac{\left(\frac{C - B}{R}\right) + (DP1 * PS)}{(DP1 * PS)}$$

where:
B, R, and PS are as defined above with respect to top and bottom margin;
C is the value at which the scale 206-C intersects the form delimiter 204-C; and
DP1 is the half the number of forms separating form delimiters 204-B and 204-C. In some embodiments, the number of forms printed is divisible by two. In such embodiments, DP1 is an integer value.

Based on the various parameters of the printer 114 and the media 200 determined from the printed calibration scales 206, the system 100, by execution of the compensation factor determination logic 110, can compute compensation factors that can be applied to compensate for uncertainties in top and bottom of form margins and length errors resulting from the printer and media parameters. Accordingly, the system 100 computes compensation factors that consider and correct for top margin, bottom margin, printer advance error, form length error, and/or other uncertainties affecting determination of top of form location. The system 100 applies the compensation factors to monitor and maintain accurate media measurements, and based on the measurements to advance the media, prior to initiating a print, to a position such that printing begins at a top of form location. Thus, the system 100 can start a print at top of form without requiring manual advancement of the media to the top of form location between successive prints.

The system 100 may apply the compensation factors to determine a next top of form location following a print as:

$$TOFLen = \frac{(PlotLen + (PSS * CF)) - 1)}{(PSS * CF)}$$

where:
TOFLen is the total length of media advanced in association with (inclusive of) a print job to position the media such that a succeeding print starts at a top of form location;
PlotLen is the computed or expected length of the print job or image to be affixed to the media 200 (i.e., the length of the data to be printed without accounting for form length errors, printer advance errors, margins, etc.);
PSS is double form length in print scan units; and
CF is correction factor as defined above.

The system 100 may the compute the distance to advance the media 200 following a print job (Pad) such that a next print job starts at a top of form location as:

Pad=TOFLen-BM-TM-PlotLen where TOFLen, PlotLen, BM, and TM are as defined above and expressed in print scan units.

Figure 4:
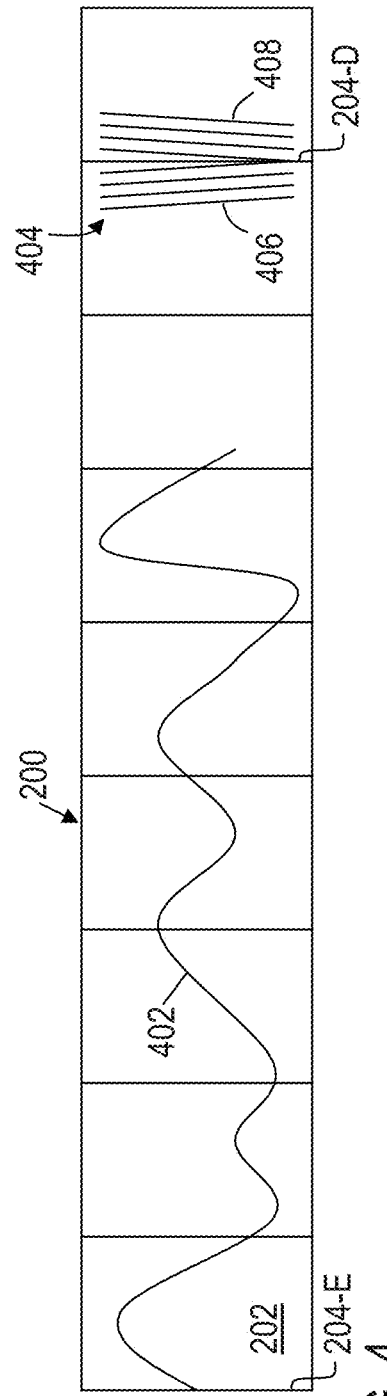
FIG. 4 shows a delta calibration scale printed across a form delimiter of continuous feed media in accordance with various embodiments.

To monitor the accuracy of top of form determination by the system 100, the system 100, via execution of the scale generation logic 108 by the processor 102, may print a delta calibration scale at the end of a print. FIG. 4 shows a delta calibration scale 404 printed across a form delimiter 204-D of the continuous feed media 200 in accordance with various embodiments. The delta calibration scale 404 is printed at the end of and as a continuation of the print 402. The delta calibration scale 404 includes a negative subscale 406 and a positive subscale 408 that respectively indicate negative and positive deviations from accurate top of form determination.

Figure 5:
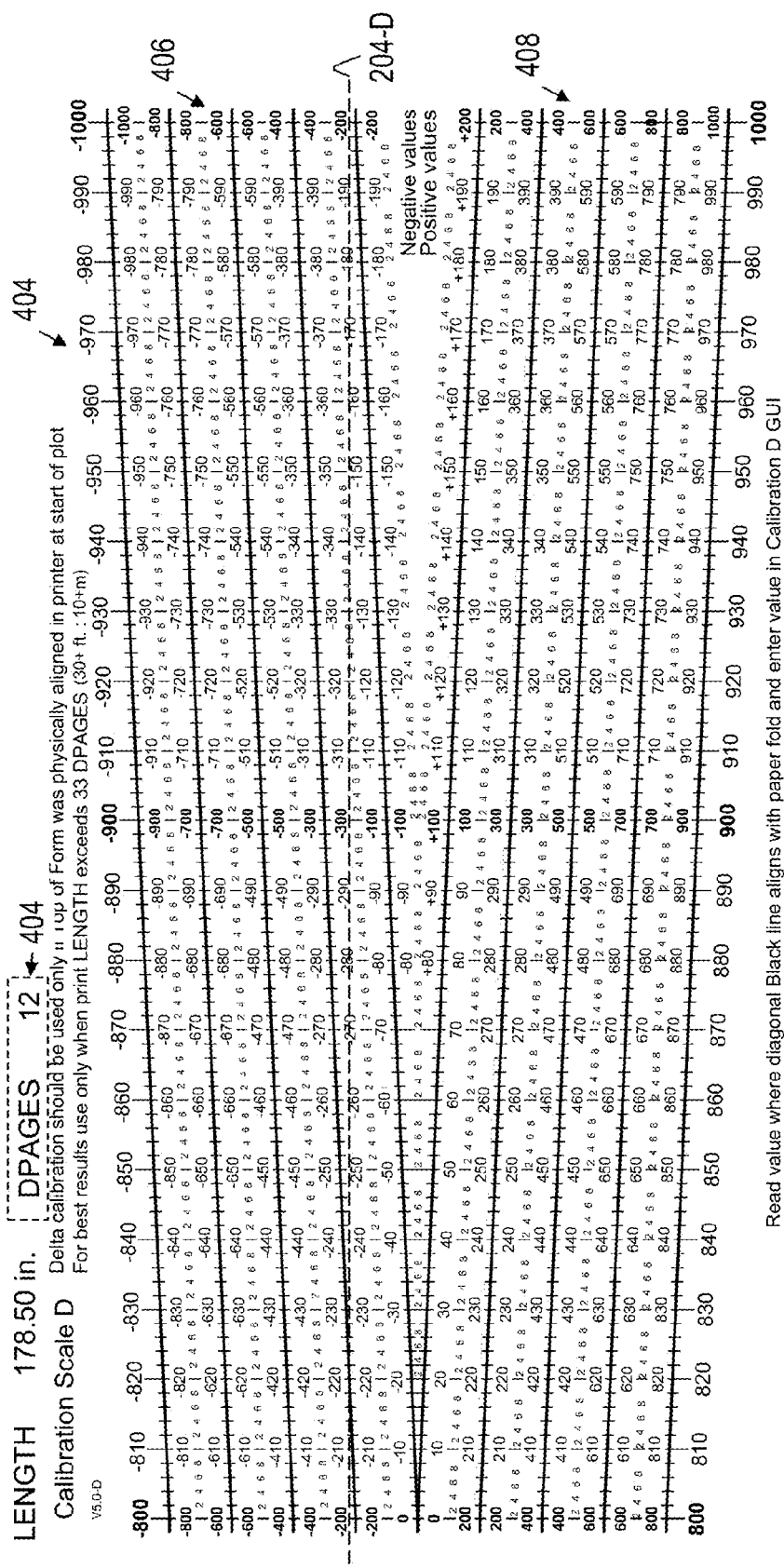
FIG. 5 shows an exemplary delta calibration scale in accordance with various embodiments.

FIG. 5 shows an example of the delta calibration scale 404 in accordance with various embodiments. The negative subscale 406 and the positive subscale 408 are shown. The form delimiter 204-D intersects the negative subscale at a value of about negative 234 (−234). The delta calibration scale 404 also shows the number of forms advanced during the print as DPAGES 404. In the example of FIG. 5, twelve double forms (24 pages) were advanced during the print that includes the scale 404. The scale value read at the intersection of the scale 404 with the delimiter 204-D indicates the magnitude and direction of accumulated error in top of form determination by the system 100. The system 100, via execution of the compensation factor determination logic 110 by the processor 102, may apply the scale value in conjunction with the DPAGES value to adjust the correction factor applied to determine the top of form location, thereby compensating for possible inaccuracies in the initial top of form determination and/or evolving changes in media size and/or printer advance errors.

The system 100 may compute a delta correction factor (DCF) as:

$$DCF = \frac{D}{R * DP2 * PS}$$

where:
R, and PS are as defined above with respect to top and bottom margin;
D is the value at which the scale 404 intersects the form delimiter 204-D; and DP2 is half the number of forms separating form delimiters 204-E and 204-D, (i.e., DPAGES on delta calibration scale 404).

The compensation factor determination logic 110 adds the delta calibration factor (DCF) to a current value of the calibration factor (CF) to adjust for accumulated error in top of form determination.

Some embodiments of the system 100 may employ calibration scales 206-A, 206-B, and 206-C to perform an initial calibration and computation of the compensation factors (e.g., top margin, bottom margin, and length correction factor) for use in subsequent top of form determination. After initial calibration, the calibration scale 404 may be employed at selected times to assess and correct the calibration. In some embodiments, the system 100 may employ the calibration scales 206-A, 206-B and/or 206-C to perform an initial calibration and computation of the correction factor for use in subsequent top of form determination, and thereafter employ the calibration scale 404 at selected times to assess and correct the calibration.

Figure 6:
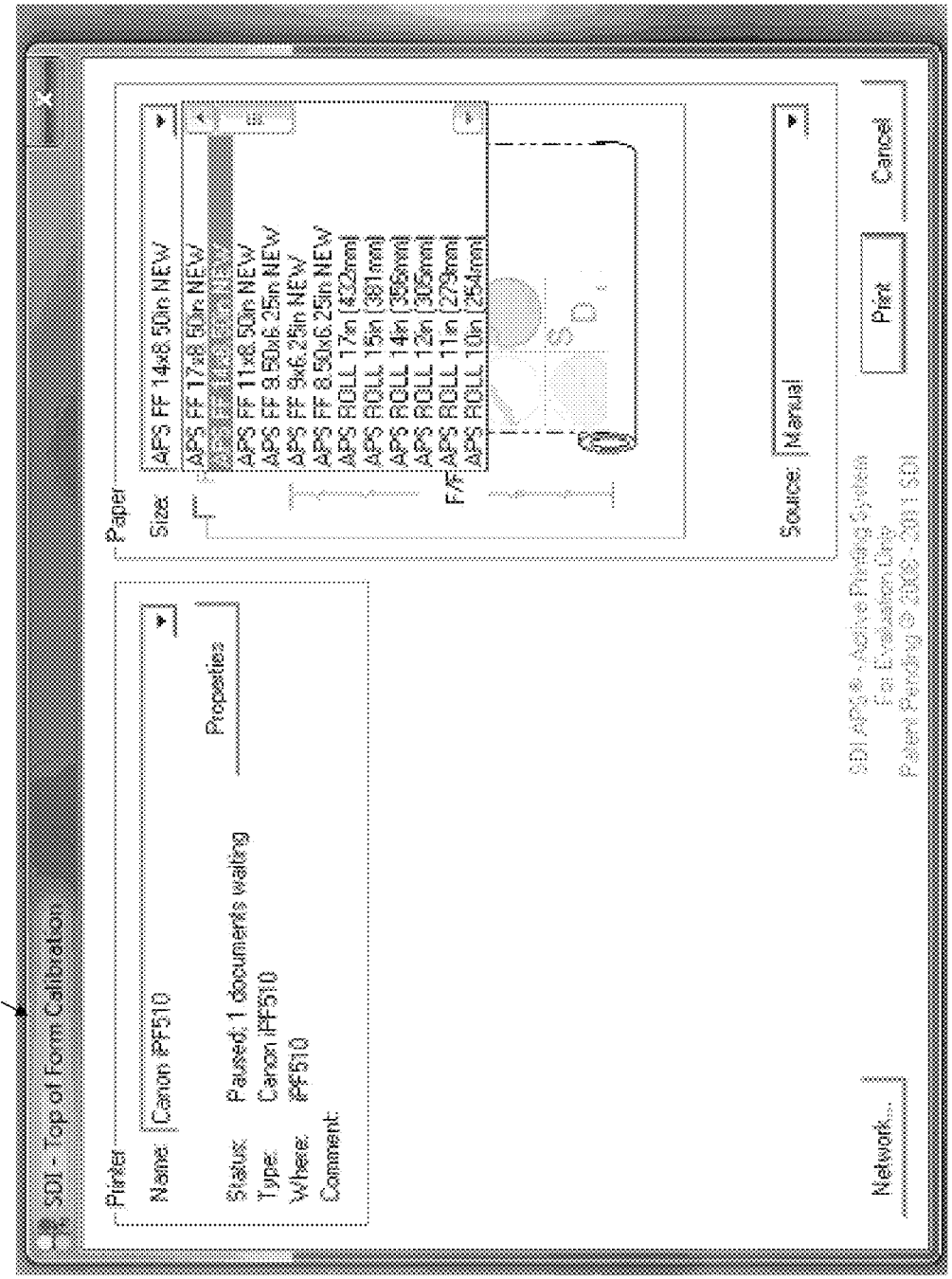
FIGS. 6 and 8 show an exemplary depiction of a launch dialog for initiating top of form calibration in accordance with various embodiments.

The system 100 provides selection of a printer and media to be calibrated, and for entry of the various calibration scale values and display of parameter and correction values via dialogs generated by processor 102 via execution of the calibration dialog logic 112. FIG. 6 shows an exemplary depiction of top of form calibration dialog that provides selection of a printer and media to be calibrated in accordance with various embodiments. As shown in dialog 600, selection of a printer and media may be via selection from drop-down menus. In dialog 600 a CANON iPF510 printer has been selected, and 14×8.5 inch fanfold paper is being selected. The designation "NEW" provided next to the media size indicates that a new (initial) calibration may be performed with respect to the specified media size. Accordingly, if a media size designated "NEW" is selected for use, the system 100 initiates printing of one or more calibration scales 206 (e.g., as shown in FIG. 2) when the print button of the dialog 600 is clicked.

Figures 7, 9:
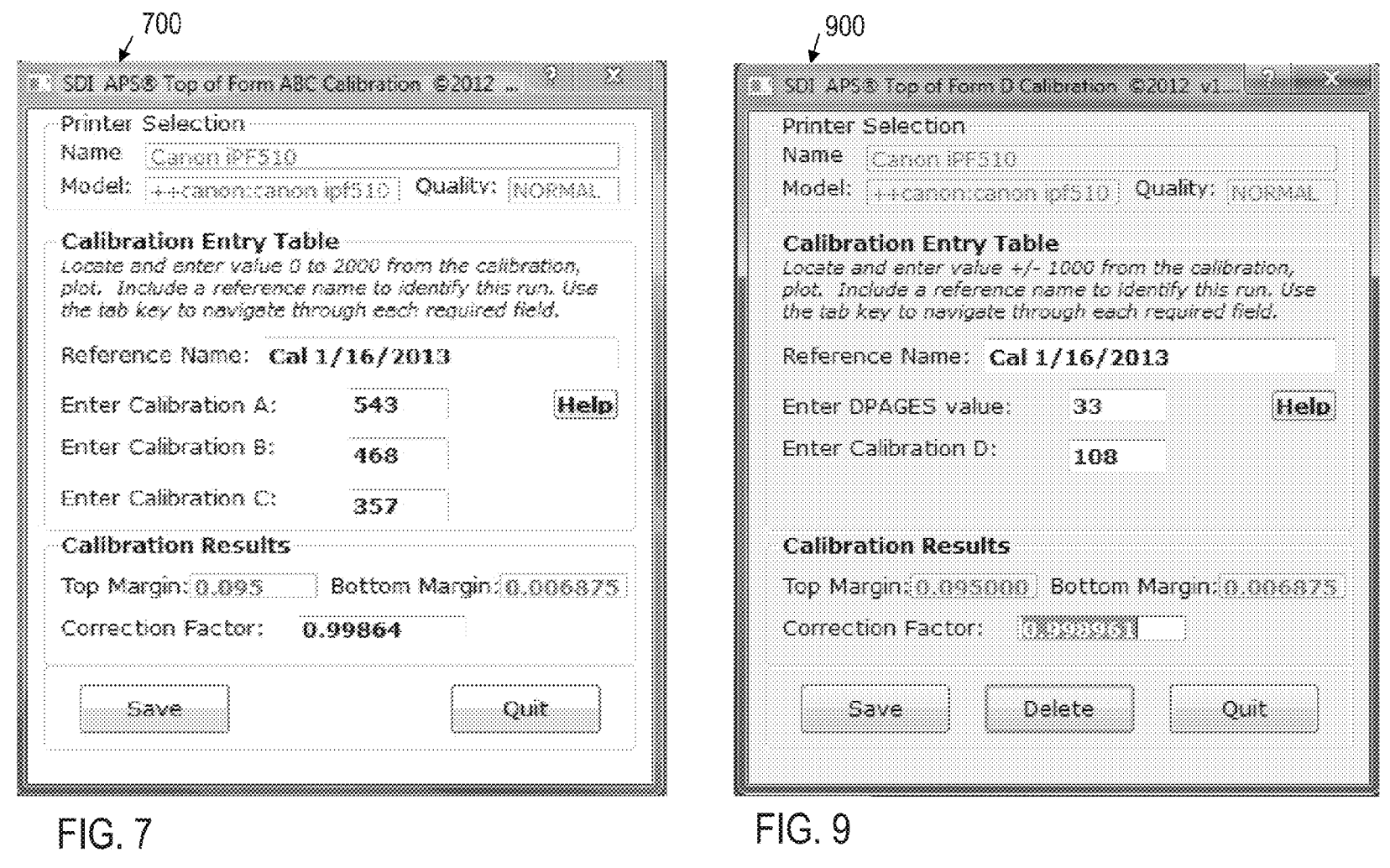

After printing of the calibration scales 206, the system 100 provides for entry of the various calibration scale values. FIG. 7 shows an exemplary depiction of a top of form calibration dialog 700 generated by the system 100. The dialog 700 displays the name and model of the printer 114 and a print quality applied by the printer 114. Fields are provided for entry of a reference name that identifies the calibration ("Cal 1/16/2013" in dialog 700) and calibration scale values. Entry fields Calibration A, Calibration B, and Calibration C, are respectively provided for entry of scale values read from the calibration scales 206-A, 206-B, and 206-C. The top margin, bottom margin, and correction factor values computed by the compensation factor determination logic 110 based on the scale values, and other information such as expected form length, are displayed. In some embodiments, a value need not be entered in the Calibration C field, and correspondingly, the compensation factor determination logic 110 may set the Correction Factor value to one (1.0).

Figure 8:
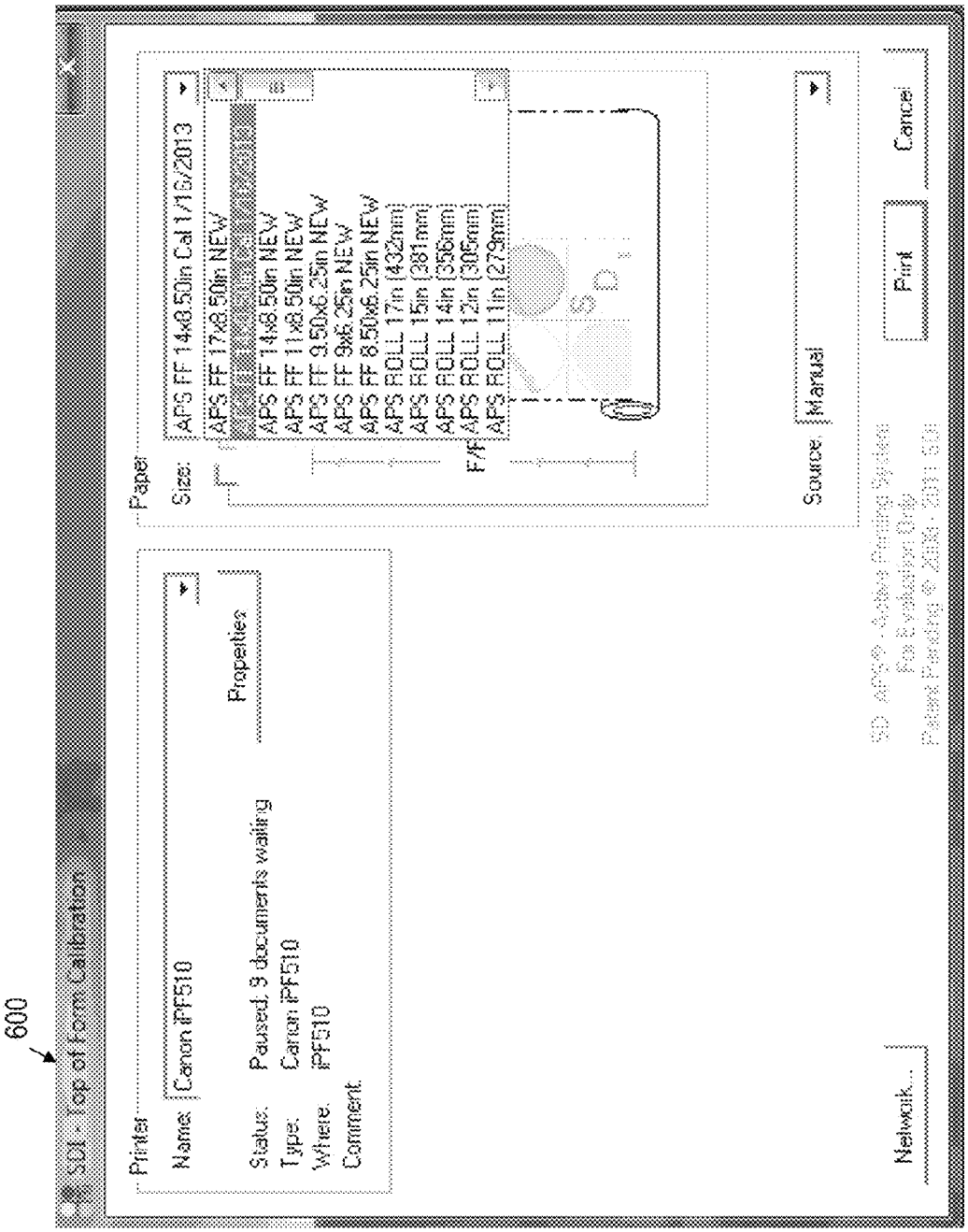

The system 100 may provide delta calibration to adjust a previously computed correction factor. FIG. 8 shows an exemplary depiction of top of form calibration dialog 600 that provides selection of a printer and media to be delta calibrated in accordance with various embodiments. In FIG. 8, the media selected is 14×8.5 inch fanfold paper, and as shown in FIG. 8, the calibration reference name "Cal 1/16/2013" is associated with the media. The calibration reference name "Cal 1/16/2013" was assigned to the 14×8.5 inch fanfold paper in dialog 700. Selection of the previously calibrated media causes the system 100 to provide for entry of the delta calibration scale values.

FIG. 9 shows an exemplary depiction of a top of form delta calibration dialog display 900 in accordance with various embodiments. The dialog 900 displays the name and model of the printer 114, and print quality applied by the printer 114. The dialog 900 also provides fields for entry of scale value read from the delta calibration scale 404, and the number of forms in the print including the calibration scale 404 (DPAGES). The compensation factor determination logic 110 adjusts the previously determined correction factor based on the scale value and number of forms advanced, and adjusted calibration results, including top margin, bottom margin, and correction factor may be displayed.

FIG. 10 shows a flow diagram for a method 1000 for top of form determination for continuous feed media in accordance with various embodiments. Though depicted sequentially as a matter of convenience, at least some of the actions shown can be performed in a different order and/or performed in parallel. Additionally, some embodiments may perform only some of the actions shown. In some embodiments, at least some of the operations of the method can be encoded in instructions provided to the processor 102 as software programming stored in the computer readable storage device 104.

In block 1002, the printer and the size of media to be calibrated and used are selected. Printer selection may include selection and/or entry of a printer name and/or model via a dialog or other information entry mechanism provided by the system 100. Selection of the type of media may include selection of a particular width and form length of continuous feed media (e.g., 14×8.5 inch fan-fold paper). Selection of printer and media may be performed via a dialog, such as dialog 600, or other information entry mechanism provided by the processor 102 through the user interfaces 116.

In block 1004, the media 200 is aligned (e.g., manually aligned) in the printer 114 such the when the processor 102 instructs the printer 114 to print, printing will commence at a top of form location of the media 200.

In block 1006, the processor 102 causes the printer 114 to print the calibration scales to the media 200. The calibration scales 206 are printed across form delimiters 204 of the media 200. In some embodiments, calibration scales 206-A, 206-B, and 206-C are printed. In some embodiments, printing of calibration scale 206-C may be optional based on user selection.

In block 1008, scale values corresponding to the intersections of form delimiters with the calibration scales are read from the media 202 and entered into or otherwise provided to the system 100. In some embodiments, the scale values may be entered via the dialog 700 generated by the system 100 or other entry mechanism provided by the system 100.

In block 1010, the system 100 processes the scale values in conjunction with other information, such as expected form length, to determine parameters of the printer 114 and the media 200 that affect top of form determination. The parameters determined may include top margin and bottom margin enforced by the printer 114, media advance error of the printer 114, form length error of the media 200, etc. Based on the determined parameters of the printer 114 and the media 200, the system 100 computes a correction factor that is applied in conjunction with the top and bottom margin values by the system 100 to determine current position of a form and top of form location.

In block 1012, the system 100 executes a print job. The printer 114 prints to the media 200 and the printing may advance the media 200 by any number of forms 202. At completion of the print job, the system 100 may apply the computed top and bottom margins and correction factor to position the media 200 in the printer 114 (i.e., advance the media 200) such that a succeeding print on the media 200 commences at a top of form location.

Positioning the media 200 such that a succeeding print commences at a top of form location may include determining the distance from the current printable location to a selected next leading edge of a form (e.g., a form delimiter or a location which causes a next print to start at a top of form location). The distance may be determined based on the current printable location computed from predetermined top and bottom margin lengths and the printed length adjusted in accordance with the predetermined correction factor. In some embodiments, where the media 200 is fan fold media, the system 100 determines the distance and advances the media 200 such that a succeeding print is initiated on an outer side of the first printed form of the media 200. The outer side is defined as the visible side of the top most form of a stack of fan fold media.

In block 1014, if delta scale printing has been enabled, the system 100 completes the print job by printing a delta calibration scale 404 across a form delimiter 204. Delta scale printing may be enabled via a control, such as a check box or radio button, provided on dialog, such as the dialog 600 or other entry mechanism as provided by the system 100.

In block 1016, a scale value corresponding to the intersection of the form delimiter with the calibration scale 404, and the number of forms printed in connection with the print job are read from the media 202 and entered into or otherwise provided to the system 100. In some embodiments, the scale value and number of forms may be entered via the dialog 900 generated by the system 100 or other entry mechanism provided by the system 100.

In block 1018, the system 100 adjusts the top of form correction factor based on the scale value and number of forms entered.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A printing system, comprising:
   a storage device encoded with instructions; and
   a processor that executes the instructions to:
   print an image on continuous feed media via a printer;
   compute a compensation factor that accounts for variation in form length of the continuous feed media;
   compute, based on the compensation factor, a distance to advance the continuous feed media such that a succeeding print starts at a top of form location of the continuous feed media; and
   cause the printer to advance the continuous feed media in accordance with the determined distance to advance such that the succeeding print starts at the top of form location of the continuous feed media.

2. The printing system of claim 1, wherein the processor executes the instructions to compute the compensation factor to account for error in continuous feed media advance distance of the printer, a top margin length enforced by the printer, and a bottom margin length enforced by the printer.

3. The printing system of claim 1, wherein the processor executes the instructions to compute the distance to advance such that the top of form location is always on an outer side of a fan fold form of the continuous feed media.

4. The printing system of claim 1, wherein the processor executes the instructions to compute a total length to advance the continuous feed media to the top of form location from a starting location of the image based on length of the image, and double form length of the continuous feed media adjusted using the compensation factor.

5. The printing system of claim 4, wherein the processor executes the instructions to compute the distance to advance the continuous feed media to the top of form location from an end location of the image as the total length less bottom margin length, top margin length, and the length of the image.

6. The printing system of claim 1, wherein the processor executes the instructions to compute the compensation factor based on an average sheet length of the continuous feed media computed based on a scale printed across form boundaries.

7. The printing system of claim 1, wherein the processor executes the instructions to:
print a scale across a form delimiter of the continuous media beyond an end location of the image on the continuous feed media as part of printing the image, and
adjust the correction factor based on a reading of the scale.

8. A method for printing, comprising:
printing, via a printer, an image on continuous feed media;
computing a compensation factor that accounts for variation in form length of the continuous feed media;
computing, based on the compensation factor, a distance to advance the continuous feed media such that a succeeding print starts at a top of form location of the continuous feed media; and
causing the printer to advance the continuous feed media in accordance with the determined distance to advance such that the succeeding print starts at the top of form location of the continuous feed media.

9. The method of claim 8, further comprising accounting for error in continuous feed media advance distance of the printer, a top margin length enforced by the printer, and a bottom margin length enforced by the printer in computing the compensation factor.

10. The method of claim 8, further comprising computing the distance to advance such that the top of form location is always on an outer side of a fan fold form of the continuous feed media.

11. The method of claim 8, further comprising computing a total length to advance the continuous feed media to the top of form location from a starting location of the image based on length of the image, and double form length of the continuous feed media adjusted using the compensation factor.

12. The method of claim 11, further comprising computing the distance to advance the continuous feed media to the top of form location from an end location of the image on the continuous feed media as the total length less bottom margin length, top margin length, and the length of the image.

13. The method of claim 8, further comprising:
computing an average form length for the continuous feed media based on scales printed across form boundaries; and
computing the compensation factor based on the average form length.

14. The method of claim 8, further comprising:
printing a scale across a form delimiter of the continuous media beyond the end of the image as part of printing the image; and
adjusting the correction factor based on a reading of the scale.

15. A computer-readable storage device encoded with instructions that when executed cause a processor to:
print, via a printer, an image on continuous feed media;
compute a compensation factor that accounts for variation in form length of the continuous feed media;
compute, based on the compensation factor, a distance to advance the continuous feed media such that a succeeding print starts at a top of form location of the continuous feed media; and
cause the printer to advance the continuous feed media in accordance with the determined distance to advance such that the succeeding print starts at the top of form location of the continuous feed media.

16. The computer-readable storage device of claim 15 encoded with instructions that when executed cause the processor to:
compute a total length to advance the continuous feed media to the top of form location from a starting location of the image based on length of the image, and double form length of the continuous feed media adjusted using the compensation factor; and
compute the distance to advance the continuous feed media to the top of form location from an end location of the image on the continuous feed media as the total length less bottom margin length, top margin length, and the length of the image.

17. The computer-readable storage device of claim 15 encoded with instructions that when executed cause the processor to compute the compensation factor to account for error in continuous feed media advance distance of the printer, a top margin length enforced by the printer, and a bottom margin length enforced by the printer.

18. The computer-readable storage device of claim 15 encoded with instructions that when executed cause the processor to compute the distance to advance such that the top of form location is always on an outer side of a fan fold form of the continuous feed media.

19. The computer-readable storage device of claim 15 encoded with instructions that when executed cause the processor to:
compute an average form length for the continuous feed media based on scales printed across form boundaries; and
compute the compensation factor based on the average form length.

20. The computer-readable storage device of claim 15 encoded with instructions that when executed cause the processor to:
print a scale across a form delimiter of the continuous media beyond the end of the image as part of printing the image; and
adjust the correction factor based on a reading of the scale.

* * * * *